United States Patent
Kallas

[19]

[11] Patent Number: 5,901,667
[45] Date of Patent: May 11, 1999

[54] PORTABLE DOORBELL FOR HOUSEPETS

[76] Inventor: Diane C. Kallas, 10123 Mc Enrue Rd., Swartz Creek, Mich. 48473

[21] Appl. No.: 08/827,636

[22] Filed: Apr. 10, 1997

Related U.S. Application Data

[60] Provisional application No. 60/015,282, Apr. 12, 1996.

[51] Int. Cl.[6] .................................................. A01K 15/02
[52] U.S. Cl. ............................................................ 119/712
[58] Field of Search ........................... 119/702–712, 719; 84/103, 402, 403, 406, 420, 421; 446/418, 422

[56] References Cited

U.S. PATENT DOCUMENTS

| | | | |
|---|---|---|---|
| 2,698,598 | 1/1955 | Hadley | 119/708 |
| 2,707,937 | 5/1955 | Herman | 119/708 |
| 3,165,023 | 1/1965 | Boynton | 84/406 |
| 4,400,696 | 8/1983 | Klingensmith | 340/573 |
| 4,517,922 | 5/1985 | Lind | 119/708 |
| 4,542,714 | 9/1985 | Ingraham et al. | 119/708 |
| 5,339,770 | 8/1994 | Haffner | 119/708 |

*Primary Examiner*—Thomas Price
*Attorney, Agent, or Firm*—Reising, Ethington, Learman & McCulloch PLLC

[57] ABSTRACT

A portable pet training device includes a generally L-shaped base having a flat bottom wall and an upstanding end wall that can be placed practically in any location on any support surface. A coil spring is anchored at one of its ends to the upstanding end wall and extends in cantilevered fashion over the bottom wall to a free end on which a bell is attached. A housepet may be conditioned to strike the spring which in turn causes the bell to ring when it is necessary to gain the attention of a caretaker.

5 Claims, 1 Drawing Sheet

PORTABLE DOORBELL FOR HOUSEPETS

This application claims the benefit of U.S. provisional application No. 60/015,282, filed Apr. 12, 1996.

This invention relates to training devices for housepets and particularly to those that enable a trained housepet, such as a dog, to alert his caretaker of the need to go outside of the house to relieve itself.

BACKGROUND OF THE INVENTION

Housepets, and particularly dogs, are usually trained or on their own develop some way of communicating to their caretaker when they need to go outside the house to relieve themselves. Some dogs bark, pant, and or pace about the house and make a general nuisance of themselves which is not always clearly understood by the caretaker as a signal to go outside. Still other pets engage in more destructive behavior such as chewing up objects, scratching at the door or carpeting, etc. The latter behavior can result in extensive and costly damage to the house and its contents.

Another problem that sometimes arises is where a housepet becomes confused when placed in an unfamiliar environment, such as the house of another caretaker or when traveling with the pet while on vacation. In such surroundings, the pet may alter its behavior and be unable to signal its need to go outside or else may engage in destructive acts such as chewing, scratching, etc. to gain attention.

A pet training device constructed in accordance with the present invention overcomes the foregoing objections.

SUMMARY OF THE INVENTION AND ADVANTAGES

The present invention concerns a portable pet training device that can be used by the caretaker of a pet, such as a dog, to train the animal to use the device to alert the caretaker when the housepet is in need of going outside to relieve itself.

According to a primary object of the present invention, the portability of the device enables it to be used in practically any environment, including familiar and unfamiliar environments, to add a level of assuredness and familiarity to the pet no matter where it is kept so it is able to communicate in a clear repeatable manner to its caretaker of its need to go outside.

The device is constructed in a preferred embodiment from durable materials including a wood or molded plastic base having a generally flat bottom wall that rests on the floor and an upright, generally vertical wall secured to the bottom wall which supports a fairly rigid, self-supporting coil spring at one of its ends in such manner that the spring projects from the upstanding wall in cantilevered fashion above the base wall and supports at its free end a bell. Such a device is simply constructed, requires no batteries or electricity, is very durable and stable, and is lightweight and portable.

Another advantage of the present invention is that it requires little training for a pet to become accustomed to using the device to signal its caretaker of the need to go outside. All the pet need do is simply strike the spring or bell with its paw causing the bell to ring. The arrangement of the spring and bell over the bottom wall has the further advantage of providing a protective portable scratching surface beneath the bell and spring which is struck by the paw of the animal rather than the underlying flooring. Once a pet becomes accustomed to using the device, it can be placed practically anywhere within hearing range of the pet owner and taken with the pet from house to house.

These and other objects, advantages and features of the present invention will become more readily apparent from the following detailed description when taken together with the sole accompanying drawing, wherein;

DRAWINGS

FIG. 1 is a front elevational perspective view of a pet-training device constructed in accordance with a presently preferred embodiment of the invention.

DETAILED DESCRIPTION

Figure 1:
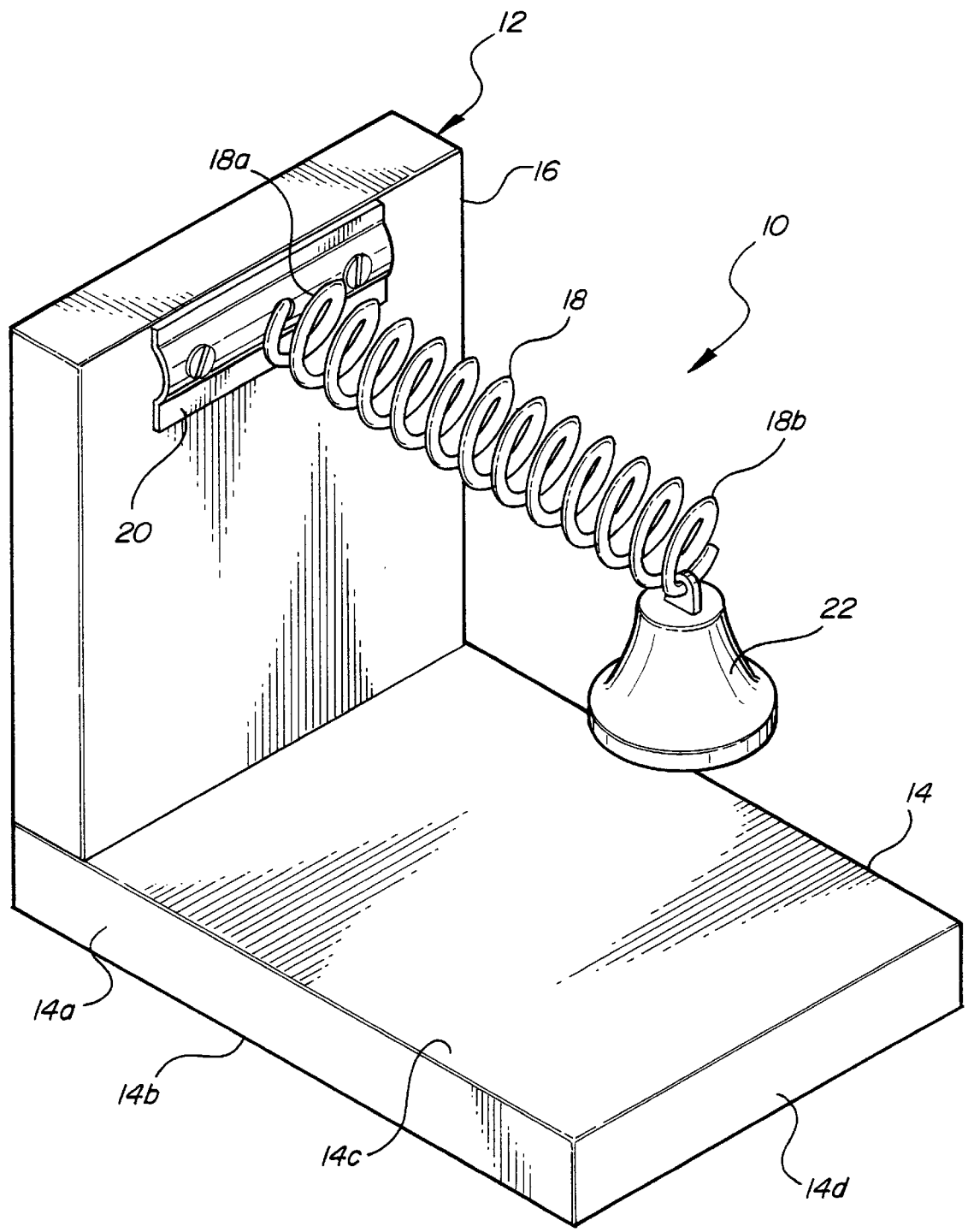

With reference to the sole drawing FIGURE, there is illustrated a housepet training device, generally indicated at 10, comprising a portable support base 12 constructed from a rigid durable and fairly weighty material such as wood or plastics material including a generally flat bottom wall portion 14 and an upstanding end wall portion 16 secured to the bottom wall 14 and projecting generally vertically upperly therefrom at a rearward end 14a of the bottom wall 14, giving the base 12 a generally a L-shaped configuration with the bottom wall 14 being somewhat longer in length than the upstanding end wall 16 (e.g., a bottom wall of about 7 inches vs. an upstanding wall of about 5 inches). The bottom wall 14 has a generally flat bottom surface 14b that enables the base 12 to be supported on a level floor and has a width of about 5½ inches making the base wall very stable and resistant to overturning.

A resilient support arm in the preferred form of a rigid coil spring 18 is anchored at its rearward end 18a to the end wall 16 of the base 12 adjacent to the upper free end of the end wall 16 by means such as a mounting bracket 20 and projects forwardly therefrom in cantilevered fashion in spaced relation over an upper surface 14c of the bottom wall 14 to a free end 18b space rearwardly from a forward free end 14d of the bottom wall 14. A bell 22 is carried at the free end 18b of the spring and is preferably of the conventional low cost type including a hollow, cup-shaped housing that gives forth a ringing sound when struck by a ball or similar ringer, supported loosely in conventional manner within the housing The bell 22 is freely swinging on the spring 18.

In use, the device 10 is placed on the floor at a location in the house that is convenient and within hearing range of the caretaker of the pet. The pet can be trained to strike the spring 18 with its paw which sets the spring 18 oscillating and in turn causes the bell 22 to ring, thereby alerting the caretaker that the pet needs to go outside. The spring 18 is preferably one that is fairly rigid with considerable spacing (e.g. 3/16 inch) between adjacent winds of the coil so that it springs back after each of repeated strikes by even large pets, and without snagging the hair, toes or nails of the pet's paw in the process which would act to discourage the pet from further use of such a device. The upper surface 14c of the bottom wall 14 further serves as a strike plate beneath the spring 18 to protect the underlying flooring from being struck by descending paw of the pet after ringing the bell 22.

When traveling with the pet to a different location, such as a vacation home or another house unfamiliar to the pet where it is going to be kept indoors, the portability of the device 10 enables it to be brought along with the pet for its use in the manner it has been trained.

It is understood that the disclosed embodiment is representative of a presently preferred form of the invention and that others that accomplish the same function are incorporate herein within the scope of any ultimately allowed patent claims. For example, the invention is not limited to the particular spring or bell mounting arrangements illustrated in the drawings, as those skilled in the art will appreciate that other ways of mounting the spring 18 to the end wall 16 an in turn the bell 22 to the spring could be utilized to accomplish the same thing. The spring, for example, could be fitted at its rearward end with a screw-in base that would enable the spring 18 to be screwed into the end wall 16.

I claim:

1. A portable pet training device comprising:
    a self-supporting base having a generally L-shaped configuration with a generally horizontally disposed bottom wall and an upstanding end wall extending generally vertically upwardly from said bottom wall;
    a coil spring anchored at one end to said end wall and extending therefrom in horizontal, vertically spaced overlying relation to said bottom wall to a free end of said spring; and
    a bell connected to said free end of said coil spring sending forth an audible ringing sound in response to a housepet striking said spring and causing said spring to oscillate.

2. The device of claim 1 wherein said coil spring includes a plurality of helical winds spaced laterally apart by a distance sufficient to accommodate toenails and hair of a pet's paw.

3. The construction of claim 1 wherein said coil spring includes a plurality of helical winds spaced laterally apart by a distance of about ⅜ inch between adjacent winds.

4. The device of claim 1 wherein said bottom wall includes a top surface underlying said coil spring and extending beyond the sides and free end of said spring to provide a protective strike surface of a pet's descending paw following the striking of said spring.

5. A method of training a housepet to alert its caretaker employing the device of claim 1, comprising the steps of:
    placing the device on a floor in hearing distance of the caretaker with the bottom wall of the device resting on the floor and the spring suspended above the floor in overlying relation to the upper surface of the bottom wall; and
    conditioning the housepet to strike the spring with its paw when it is necessary to gain the attention of the caretaker.

\* \* \* \* \*